US010253436B2

(12) United States Patent
Wesson et al.

(10) Patent No.: US 10,253,436 B2
(45) Date of Patent: Apr. 9, 2019

(54) METHOD OF MAKING AN ELEVATOR SUSPENSION AND/OR DRIVING ASSEMBLY HAVING AT LEAST ONE TRACTION SURFACE DEFINED BY WEAVE FIBERS

(71) Applicant: OTIS ELEVATOR COMPANY, Farmington, CT (US)

(72) Inventors: John P. Wesson, Vernon, CT (US); Gopal R. Krishnan, Wethersfield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 42 days.

(21) Appl. No.: 15/461,856

(22) Filed: Mar. 17, 2017

(65) Prior Publication Data

US 2017/0190546 A1   Jul. 6, 2017

Related U.S. Application Data

(63) Continuation of application No. 13/641,882, filed as application No. PCT/US2010/049433 on Sep. 20, (Continued)

(51) Int. Cl.
*D07B 5/00*      (2006.01)
*D03D 13/00*    (2006.01)
(Continued)

(52) U.S. Cl.
CPC ........... *D03D 13/004* (2013.01); *B66B 7/062* (2013.01); *D03D 1/0094* (2013.01); *D03D 11/00* (2013.01);
(Continued)

(58) Field of Classification Search
CPC combination set(s) only.
See application file for complete search history.

(56) References Cited

U.S. PATENT DOCUMENTS 1,475,250 A   11/1923   Sundh
1,477,886 A   12/1923   Lewis
(Continued)

FOREIGN PATENT DOCUMENTS

CN   1664202 A    9/2005
CN   10349023 A   1/2009
(Continued)

OTHER PUBLICATIONS

International Search Report and Written Opinion of the International Searching Authority for International application No. PCT/US2010/049433 dated May 23, 2011.
(Continued)

*Primary Examiner* — Nathan H Empie
(74) *Attorney, Agent, or Firm* — Carlson, Gaskey & Olds

(57) ABSTRACT

An illustrative example method of making an elongated load bearing member includes providing a plurality of tension elements. A plurality of weave fibers are woven together with the tension elements to thereby establish a weave. A traction surface is established on at least one side of the load bearing member. The traction surface is defined by the weave fibers. Coating the weave fibers with a compressible coating provides an exterior surface texture defined at least in part by the weave fibers.

9 Claims, 2 Drawing Sheets

Related U.S. Application Data 2010, now Pat. No. 9,617,118, which is a continuation of application No. PCT/US2010/034641, filed on May 13, 2010.

(51) Int. Cl.

| | | |
|---|---|---|
| *B66B 7/06* | (2006.01) | |
| *D03D 1/00* | (2006.01) | |
| *D03D 15/00* | (2006.01) | |
| *D03D 15/02* | (2006.01) | |
| *D03D 15/04* | (2006.01) | |
| *D03J 1/06* | (2006.01) | |
| *D07B 1/22* | (2006.01) | |
| *D07B 5/04* | (2006.01) | |
| *D03D 15/08* | (2006.01) | |
| *D06M 15/564* | (2006.01) | |
| *D03D 11/00* | (2006.01) | |
| *D03D 41/00* | (2006.01) | |
| *B29C 61/02* | (2006.01) | |

(52) U.S. Cl.
CPC ....... *D03D 13/006* (2013.01); *D03D 15/0094* (2013.01); *D03D 15/02* (2013.01); *D03D 15/04* (2013.01); *D03D 15/08* (2013.01); *D03D 41/00* (2013.01); *D03J 1/06* (2013.01); *D06M 15/564* (2013.01); *D07B 1/22* (2013.01); *D07B 5/005* (2013.01); *D07B 5/006* (2015.07); *D07B 5/04* (2013.01); *B29C 61/02* (2013.01); *D07B 2201/1092* (2013.01); *D07B 2205/2003* (2013.01); *D07B 2205/2064* (2013.01); *D07B 2501/2007* (2013.01); *D10B 2101/20* (2013.01); *D10B 2401/04* (2013.01); *D10B 2401/063* (2013.01); *D10B 2403/02411* (2013.01); *D10B 2403/02412* (2013.01)

(56) References Cited

U.S. PATENT DOCUMENTS

| | | |
|---|---|---|
| 2,088,448 A | 7/1937 | Specht |
| 2,332,393 A | 10/1943 | Neville |
| 2,983,304 A | 5/1961 | Rasero |
| 3,148,710 A | 9/1964 | Rieger et al. |
| 3,297,513 A | 1/1967 | Robinson |
| 3,473,576 A | 10/1969 | Amneus |
| 3,885,603 A | 5/1975 | Slaughter |
| 3,973,670 A | 8/1976 | Spaar |
| 4,109,543 A | 8/1978 | Foti |
| 4,305,433 A | 12/1981 | Vanassche et al. |
| 4,407,885 A | 10/1983 | Murphy et al. |
| 4,767,389 A | 8/1988 | Habegger et al. |
| 4,820,571 A | 4/1989 | Searfass |
| 4,870,998 A | 10/1989 | Westhead |
| 4,887,656 A | 12/1989 | Verbauwhede et al. |
| 4,945,952 A | 8/1990 | Vohringer |
| 5,196,092 A | 3/1993 | Stigberg |
| 5,292,578 A | 3/1994 | Kolzer |
| 5,454,403 A | 10/1995 | Kerr et al. |
| 5,456,171 A | 10/1995 | Biava et al. |
| 5,566,786 A | 10/1996 | De Angelis et al. |
| 5,609,242 A | 3/1997 | Hutchins et al. |
| 6,295,799 B1 | 10/2001 | Baranda |
| 6,736,714 B2 | 5/2004 | Dudovicz |
| 6,866,068 B2 | 3/2005 | Berger et al. |
| 6,905,574 B2 | 6/2005 | Festor |
| 7,086,217 B2 | 8/2006 | Eichhorn et al. |
| 7,217,210 B2 | 5/2007 | Wood |
| 7,287,553 B2 | 10/2007 | Wahhoud |
| 7,661,514 B2 | 2/2010 | Ach |
| 7,670,240 B2 | 3/2010 | Pitts et al. |
| 7,971,687 B2 | 7/2011 | Alves et al. |
| 8,210,320 B2 | 7/2012 | Ach |
| 2003/0036325 A1 | 2/2003 | Schneider et al. |
| 2004/0033856 A1 | 2/2004 | Levine |
| 2007/0102183 A1 | 5/2007 | Jotti et al. |
| 2007/0235595 A1 | 10/2007 | Braekevelt et al. |
| 2008/0067007 A1 | 3/2008 | Ach |
| 2009/0107776 A1* | 4/2009 | Baranda .............. B66B 7/06 187/254 |
| 2009/0126296 A1 | 5/2009 | Veronesi et al. |
| 2011/0259677 A1 | 10/2011 | Dudde et al. |

FOREIGN PATENT DOCUMENTS

| | | |
|---|---|---|
| DE | 10100484 A1 | 7/2002 |
| EP | 0228725 | 7/1987 |
| EP | 1561719 A1 | 8/2008 |
| EP | 2154097 A1 | 2/2010 |
| GB | 1583853 | 5/1978 |
| GB | 1559380 | 1/1980 |
| JP | 6178434 A | 7/1993 |
| JP | H10168701 A | 6/1998 |
| JP | 2002201547 A | 7/2002 |
| JP | 2004155589 A | 6/2004 |
| KR | 10881930 B1 | 2/2009 |
| KR | 10-0910981 | 8/2009 |
| WO | 99/43589 | 9/1999 |
| WO | 01/14630 A1 | 3/2001 |
| WO | 03029556 A1 | 4/2003 |
| WO | 03042085 A1 | 5/2003 |
| WO | 2004029343 A1 | 4/2004 |
| WO | 2005007988 A2 | 1/2005 |
| WO | 2005068696 A1 | 7/2005 |
| WO | 2005094255 A2 | 10/2005 |

OTHER PUBLICATIONS

Extended European Search Report for Application No. EP 10 85 1528 dated Feb. 26, 2014.

International Preliminary Report on Patentability for International Application No. PCT/US2010/049433 dated Nov. 22, 2012.

Search Report of the State Intellectual Property Office of People's Republic China for Application No. 201080066738.8 dated Jun. 7, 2013.

Extended European Search Report for Application No. EP 10 85 1509 dated Feb. 24, 2014.

State Intellectual Property Office of People's Republic China, First Search for Application No. 201080066737.3 dated Mar. 19, 2014.

* cited by examiner

METHOD OF MAKING AN ELEVATOR SUSPENSION AND/OR DRIVING ASSEMBLY HAVING AT LEAST ONE TRACTION SURFACE DEFINED BY WEAVE FIBERS

CROSS REFERENCE TO RELATED APPLICATIONS

This application is a continuation of U.S. patent application Ser. No. 13/641,882, filed Oct. 18, 2012, which is the national stage application of PCT/US10/49433, filed Sep. 20, 2010, which claims priority to PCT/US10/34641, filed May 13, 2010.

BACKGROUND

There are a variety of uses of elongated load carrying members such as round ropes or flat belts. One such use is to suspend the loads in elevator systems and known load carrying members are used for driving/propulsion in elevator systems. Round steel ropes have been the industry standard for many years. More recently flat belts including a plurality of tension member cords substantially retained in a jacket have been used in elevator systems. While there are advantages associated with such belts in an elevator system, there are also challenges presented.

For example, one challenge presented by some elevator belts is achieving a desired amount of traction between the belt and a traction sheave that causes movement of the belt and thus the elevator car. Different approaches have been suggested to achieve particular traction characteristics on a surface of an elevator belt. One approach is shown in the Published International Application WO 2005/094255. In that document, a jacket includes a roughened surface to provide desired friction characteristics.

SUMMARY

An illustrative example method of making an elongated load bearing member includes providing a plurality of tension elements. A plurality of weave fibers are woven together with the tension elements to thereby establish a weave. A traction surface is established on at least one side of the load bearing member. The traction surface is defined by the weave fibers. Coating the weave fibers with a compressible coating provides an exterior surface texture defined at least in part by the weave fibers.

The various features and advantages of the disclosed examples will become apparent to those skilled in the art from the following detailed description. The drawings that accompany the detailed description can be briefly described as follows.

DETAILED DESCRIPTION

Figure 1:
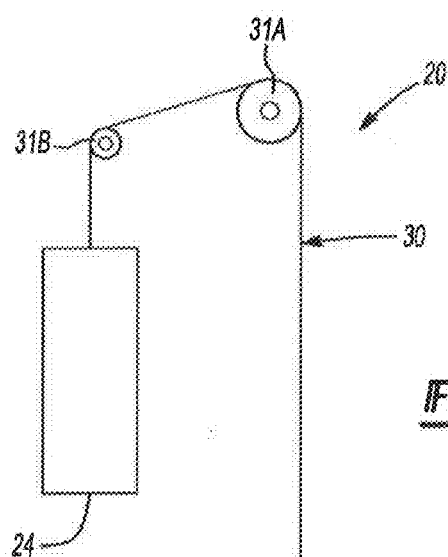
FIG. 1 schematically shows selected portions of an example elevator system.

FIG. 1 schematically shows selected portions of an example traction elevator system 20. The illustrated example is for discussion purposes only. Features of the elevator system 20 that are not required for an understanding of the present invention (e.g. guide rails, safeties, etc.) are not shown or discussed. Those skilled in the art will appreciate that the present invention could be used in a variety of elevator system configurations and not only the specific example shown in this Figure. This example includes an elevator car 22 coupled with a counterweight 24 by one or more elongated elevator load bearing members 30 in a 1:1 roping arrangement. Other roping arrangements, such as 2:1 or greater, are possible. The weight of the elevator car 22 and counterweight 24 is suspended by the elongated elevator load bearing members 30. A traction sheave 31A causes desired movement of the elongated elevator load bearing members 30 to achieve desired movement and placement of the elevator car 22 within the hoistway. The elevator system 20 could include one or more deflector pulleys 31B as seen in FIG. 1 that also engage the elongated elevator load bearing members 30 or one or more idler or diverter pulleys on the car 22 and/or counterweight 24 (for example to provide an overslung or underslung roping arrangement) that also engage the elongated elevator load bearing members 30.

Figure 2:
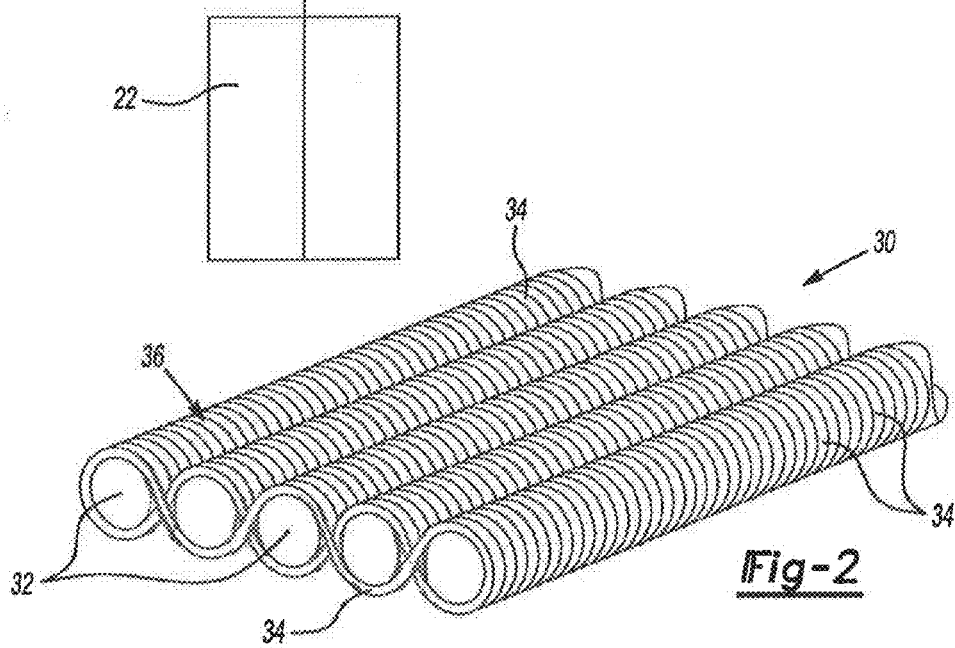
FIG. 2 diagrammatically illustrates an example load bearing member having a traction surface defined by weave fibers that are woven together with tension elements.

FIG. 2 illustrates an example elongated elevator load bearing member 30. This example includes a plurality of tension elements 32. As can be appreciated from the drawing, the tension elements 32 are arranged generally parallel to each other and extend in a longitudinal direction that establishes a length dimension of the elongated elevator load bearing member 30. A plurality of weave fibers 34 are woven together with the tension elements 32. In this example, the weave fibers 34 and the tension elements 32 are woven together into a fabric that maintains the tension elements 32 in a desired orientation relative to each other. In other words, the weave fibers 34 substantially retain the tension elements 32 in position. The phrase "substantially retained" means that the weave fibers 34 sufficiently engage the tension elements 32 such that the tension elements 32 do not pull out of, or move relative to, the weave fibers 34 in use (i.e., during the application on the elongated elevator load bearing member 30 of a load that can be encountered during use in an elevator system 20 with, potentially, an additional factor of safety). The weave fibers 34 have a length that is transverse to the length or longitudinal direction of the tension elements 32.

The example load bearing members 30 include a traction surface 36 on at least one side of the load bearing member 30. The traction surface 36 is defined by the weave fibers 34. In this description, having the traction surface 36 defined by the weave fibers 34 includes the weave fibers being exposed at the traction surface 36, a coating over the weave fibers 34 having a surface contour that is defined by the presence of the weave fibers 34 or a combination of these.

The tension elements 32 are the primary load bearing structure of the elevator load bearing member 30. In some examples, the weave fibers 34 do not support the weight of the elevator car 22 or counterweight 24. Nevertheless, the weave fibers 34 do form part of the load path. The weave fibers transmit the traction forces between the traction sheave 31 and the elevator load bearing member 30 to the tension elements 32. Such traction force transmission in some examples is direct (e.g., when the weave fibers 34 are exposed at the traction surface 36) or indirect (e.g., when the weave fibers 34 are coated and the coating establishes the exterior of the traction surface 36)

The weave fibers 34 are arranged in a pattern relative to the tension elements 32 so that a spacing between the traction surface 36 and the tension elements 32 prevents the tension elements 32 from contacting any component that the traction surface 36 engages. For example, the tension elements 32 will not contact a surface on the traction sheave 31 as the load bearing member 30 wraps at least partially about the tension sheave 32. The size of the weave fibers 34, the material of the weave fibers 34, the pattern of the weave fibers 34 or a combination of these is selected to ensure the desired spacing between the tension elements 32 and the traction surface 36 so that the tension elements 32 are protected from engagement with a component such as the traction sheave 31.

In one example, a coating over the weave fibers 34 ensures that the tension elements 32 are sufficiently spaced from the traction surface 36 so that the tension elements 32 will not directly engage or come in contact with another component in the elevator system 20 such as a surface on the traction sheave or another sheave. In this example, an exterior surface of the coating is the traction surface 36.

In one example the tension elements 32 comprise a first material and the weave fibers 34 comprise a second, different material. In the illustrated example, the weave fibers 34 have a much smaller thickness or cross-sectional dimension compared to that of the tension elements 32. In one example the tension elements 32 are metallic, such as drawn steel, and the weave fibers 34 comprise non-metallic materials, such as polymers for example.

In some examples, the weave fibers 34 include or comprise an elastomer material that is useful for establishing the traction surface 36. One example includes establishing weave fibers 34 of a desired material and then coating the fibers with the elastomer material. Another example includes establishing the woven fabric that includes the tension elements 32 and the weave fibers 34 and then coating at least the weave fibers 34 at least partially with the selected elastomer material. Another example includes making each of the weave fibers 34 out of a plurality of filaments and including filaments made of the selected elastomer material within each of the weave fibers 34. Another example includes impregnating the weave fibers 34 with a selected elastomeric material.

One example elastomer material comprises a urethane. Thermoplastic polyurethane is used on one example.

Figure 3:
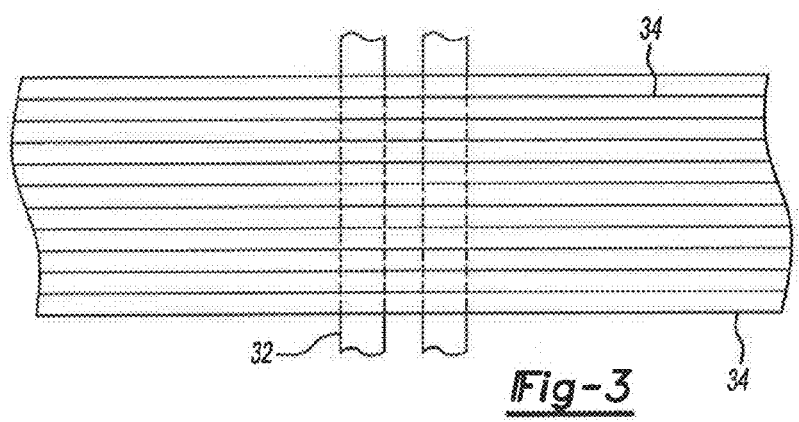
FIG. 3 schematically shows one example weave pattern that defines the correspondingly configured traction surface.

A variety of different weave patterns can be used to weave together the weave fibers 34 and the tension elements 32. FIG. 3 shows one such example pattern of the weave fibers 34. In this example, the weave fibers 34 are aligned generally parallel to each other and generally perpendicular to the longitudinal direction of the tension elements 32. FIG. 3 is not intended to illustrate a complete woven fabric or a complete load bearing member 30. Instead, FIG. 3 is intended to illustrate the weave pattern of the weave fibers 34.

In an example weave pattern like FIGS. 2 and 3, the traction surface 36 could have a non-continuous or non-planar surface texture. As can be appreciated from the illustrations, a plurality of ridges will be generally parallel to each other and transverse to the longitudinal direction or length of the load bearing member. In other words, the weave fibers 34 establish ridges on the traction surface.

Figure 4:
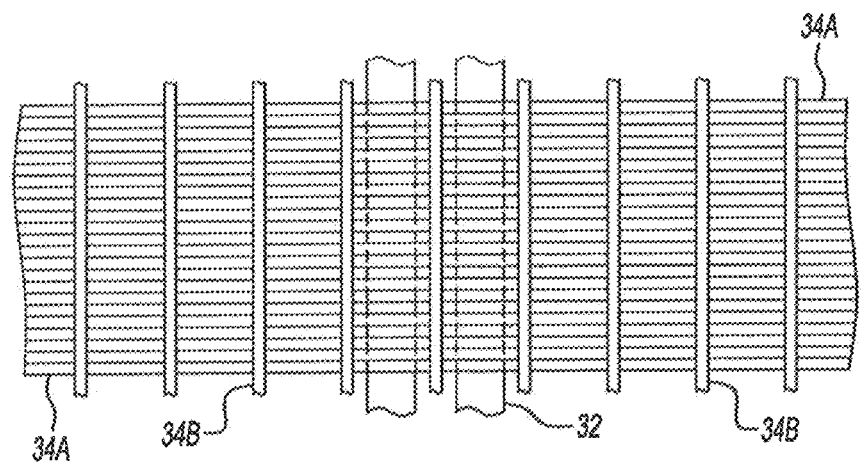
FIG. 4 schematically shows another example weave pattern that defines a correspondingly configured traction surface.

FIG. 4 schematically illustrates another example weave pattern. In this example, some of the weave fibers 34*a* are arranged generally perpendicular to the longitudinal direction or length of the tension elements 32. Others of the weave fibers 34*b* are arranged generally parallel to the tension elements 32 and generally perpendicular to the weave fibers 34*a*. As can be appreciated by comparing FIG. 4 to FIG. 3, the example weave pattern of FIG. 4 will have a slightly different characteristic on the traction surface 36 when the weave fibers 34*b* are included in a position between a tension element 32 and the traction surface 36. In another example, the weave fibers 34*b* are maintained only between the tension elements 32 and do not have an impact on the contour or texture of the traction surface 36.

Figure 5:
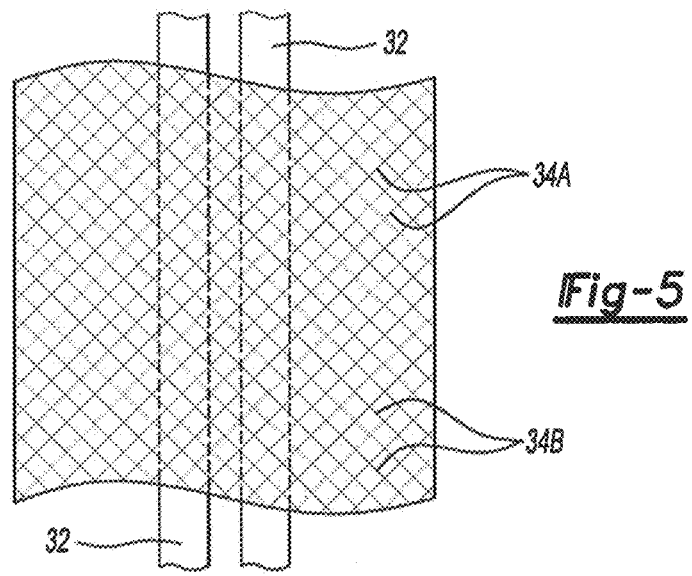
FIG. 5 schematically shows another example weave pattern that establishes a correspondingly configured traction surface.

FIG. 5 illustrates another example weave pattern in which some of the weave fibers 34*a* are arranged parallel to each other and at a first angle relative to the tension elements 32. Others of the weave fibers 34*b* are arranged generally parallel to each other and at a second, different angle relative to the length or longitudinal direction of the tension elements 32. As can be appreciated from the illustration, a woven fabric using the weave pattern of FIG. 5 will have a different traction surface texture or configuration compared to that which would be established by the weave patterns of FIG. 3 or 4, for example.

In any of the examples of FIGS. 3-5, a relatively thin coating may be applied on top of the woven fabric in a manner that the weave pattern of the weave fibers 34 influences or defines the contour or texture on the traction surface 36 even though the weave fibers 34 are completely coated with another material. In other words, it is not necessary for any of the weave fibers 34 to be exposed at the traction surface 36 for them to define the contour or texture of the traction surface 36.

Figure 6:
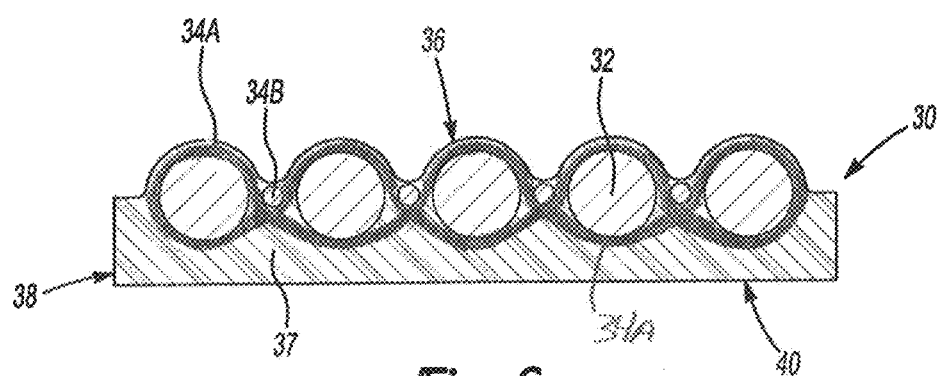
FIG. 6 is a cross-sectional illustration of another example load bearing member.

FIG. 6 illustrates another example configuration of an elongated elevator load bearing member 30. In this example, a material 37 is provided over at least one side of the woven fabric that includes the tension elements 32 and the weave fibers 34 to form a jacket 38. In this example, the weave fibers 34*a* define the traction surface 36 on one side of the load bearing member 30 and the jacket 38 defines another surface 40 on an opposite side of the load bearing member 30. In some examples, the surface 40 will contact one or more sheaves in the elevator system 20 but the traction surface 36 is oriented to contact the traction sheave 31 to achieve a desired friction characteristic or traction between the load bearing assembly 30 and the traction sheave 31. The material 37 could be, for example, a suitable non-metallic, polymer material such as an elastomer like urethane including thermoplastic polyurethane.

In one example, the material 37 used for establishing the jacket 38 also provides a coating over the weave fibers 34 so that the jacket material also exists on the traction surface 36. The contour or texture of the traction surface 36 is still defined at least in part by the weave fibers 34.

In the example of FIG. 6, the weave fibers 34*b* are positioned between the tension elements 32 and do not have an effect on the traction surface 36. In another example, additional weave fibers are positioned generally parallel to the weave fibers 34*b* and closer to the top of the tension elements 32 (according to the drawing) such that they will have an influence on the configuration or texture of the traction surface 36.

The disclosed examples provide a woven fabric as a basis for an elevator load bearing member. They also provide the ability to configure a traction surface based on the characteristics and arrangement of the weave fibers that are woven together with the tension elements.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making an elongated elevator load bearing member for a traction elevator system, comprising the steps of:
   providing a plurality of tension elements aligned along a length of the elevator load bearing member;
   weaving a plurality of weave fibers together with the tension elements, the weave fibers being oriented transverse to the length of the elevator load bearing member; and
   establishing a traction surface on at least one side of the elevator load bearing member, the traction surface being defined by the weave fibers; and
   coating the weave fibers with a compressible coating, the coating having an exterior surface texture including a plurality of ridges transverse to the length of the elevator load bearing member, the ridges being defined at least in part by the weave fibers, the ridges establishing an outermost exterior of the traction surface.

2. The method of claim 1, comprising applying the coating to at least the weave fibers subsequent to weaving the weave fibers and the tension elements together.

3. The method of claim 1, comprising establishing a spacing between the tension elements and the traction surface using the weave fibers.

4. The method of claim 3, comprising arranging the weave fibers in a pattern that prevents the tension elements from contacting an elevator sheave that the traction surface is configured to engage.

5. The method of claim 1, comprising including elastomer material fibers in the weave fibers.

6. The method of claim 1, comprising
   arranging some of the weave fibers generally parallel to each other;
   arranging the some of the weave fibers at a first angle relative to the tension elements;
   arranging others of the weave fibers generally parallel to each other; and
   arranging the others of the weave fibers at a second, different angle relative to the tension elements.

7. The method of claim 1, wherein the tension elements comprise a first material and the weave fibers comprise a second, different material.

8. The method of claim 1, wherein the coating comprises at least one of urethane and thermoplastic polyurethane.

9. The method of claim 1, wherein the coating comprises an elastomer.

* * * * *